United States Patent
Youn et al.

(10) Patent No.: US 8,238,310 B2
(45) Date of Patent: Aug. 7, 2012

(54) SYSTEM AND METHOD FOR RELAYING MULTICAST BROADCAST SERVICE

(75) Inventors: Hee Yong Youn, Seongnam (KR); Chi Hyun Cho, Suwon (KR); Kyung Tae Kim, Suwon (KR)

(73) Assignee: Sungkyunkwan University (KR)

( * ) Notice: Subject to any disclaimer, the term of this patent is extended or adjusted under 35 U.S.C. 154(b) by 776 days.

(21) Appl. No.: 12/315,755

(22) Filed: Dec. 5, 2008

(65) Prior Publication Data

US 2009/0285145 A1  Nov. 19, 2009

(30) Foreign Application Priority Data

May 15, 2008  (KR) .................. 10-2008-0044838

(51) Int. Cl.
*H04W 4/00* (2009.01)
(52) U.S. Cl. .................................... 370/332
(58) Field of Classification Search .......... 370/312, 370/328, 332, 310.2, 315, 331, 465, 338
See application file for complete search history.

(56) References Cited

U.S. PATENT DOCUMENTS

| | | | | |
|---|---|---|---|---|
| 7,386,277 B2 * | 6/2008 | Cho et al. | ......... | 455/69 |
| 2004/0264507 A1 * | 12/2004 | Cho et al. | ......... | 370/480 |
| 2007/0155337 A1 * | 7/2007 | Park et al. | ......... | 455/69 |
| 2007/0183529 A1 * | 8/2007 | Tujkovic et al. | ......... | 375/267 |
| 2007/0191024 A1 * | 8/2007 | Kim et al. | ......... | 455/456.2 |
| 2007/0264932 A1 * | 11/2007 | Suh et al. | ......... | 455/13.1 |
| 2008/0019321 A1 * | 1/2008 | Kim et al. | ......... | 370/332 |
| 2008/0159192 A1 * | 7/2008 | Lee et al. | ......... | 370/310 |
| 2008/0159203 A1 * | 7/2008 | Choi et al. | ......... | 370/328 |

OTHER PUBLICATIONS

Cho, et al., "*Mobile Multi-hop Relay System using AMC for Multicast Broadcast Service ofer Mobile WiMAX*", Apr. 26, 2008, Wireless Telecommunication Symposium 2008 Papers.
Shrestha, et al., "*New Approaches for Relay Selection in IEEE 802.16 Mobile Multi-hop Relay Networks*", Aug. 2007, Proc. Euro-par 2007, pp. 950-959.
Erwi, et al., "*Performance Evaluation of Bandwidth Allocation in 802.16j Mobile Multi-hop Relay Networks*", Apr. 2007, The 65th IEEE VTC2007-Spring.

* cited by examiner

*Primary Examiner* — Andrew Lai
*Assistant Examiner* — Anh Ngoc Nguyen
(74) *Attorney, Agent, or Firm* — Martine Penilla Group, LLP (57) ABSTRACT

A system and method for relaying Multicast Broadcast Service (MBS) are provided. The system for relaying MBS includes a base station; and a plurality of relay stations, wherein the relay stations forms multi-hop relay network, and wherein the base station selects a Modulation and Coding Scheme (MCS) level among a plurality of MCS levels based on channel condition between the base station and the respective relay stations. The MBS relay system of the present invention provides improved data throughput and stable broadcast services.

9 Claims, 7 Drawing Sheets

SYSTEM AND METHOD FOR RELAYING MULTICAST BROADCAST SERVICE

CROSS-REFERENCE TO RELATED APPLICATION

The present application is claiming priority of Korean Patent Application No. 10-2008-0044838, filed on May 15, 2008, the content of which is incorporated herein by reference.

BACKGROUND OF THE INVENTION

1. Field of the Invention

The present invention relates to a system and method for relaying Multicast Broadcast Service (MBS). More particularly, the present invention relates to a system and method for relaying MBS employing an Adaptive Modulation and Coding (AMC) scheme.

2. Description of the Related Art

Recently, studies on MBS capable of providing broadcast services more efficiently for mobile WiMAX are under progress.

MBS is an efficient mechanism to transmit same data to all users participating in the MBS using shared system resources. MBS technique is defined by IEEE802.16e standards, so detailed description on it will not be provided in this specification.

MBS zone, which is a group of base stations (BS) serving synchronized MBS contents data to mobile stations, provides MBS data with the single frequency network operation scheme. It is also obvious to people skilled in the art that multiple MBS zones are also feasible.

Mobile WiMAX system can transmit data to a target mobile station using a 16-bit connection ID (CID) in MAC layer. It also supports macro diversity, which improves the probability of successful data reception and reduces power consumption and overall interference.

Despite the features described above, the performance of MBS system is easily influenced by location and mobility of mobile stations, channel condition, etc. To increase the performance of MBS, therefore, an efficient modulation and coding scheme is required.

In downlink mode, Mobile WiMAX system uses three types of modulation: Quadrature Phase Shift Keying (QPSK), 16 Quadrature Amplitude Modulation (QAM), and 64 QAM. The modulation scheme, combined with the coding scheme, is used as Modulation and Coding Scheme (MCS) levels. With suitable modification of the MCS levels, it becomes possible to achieve high data throughput and keep a specific Bit Error Ratio (BER).

Although Mobile WiMAX system with higher MCS level may have higher throughput, it does not necessarily guarantee stable services due to its sensitivity to channel conditions.

SUMMARY OF THE INVENTION

It is, therefore, an object of the present invention to provide a system and method for relaying MBS providing high data throughput and stable service.

Another object of the present invention is to provide a system and method for relaying MBS employing AMC according to channel condition between base station and relay stations.

Still another object of the present invention is to provide a system and method for relaying MBS to properly increase the MCS level of MBS and maintain a predetermined level of BER.

In accordance with one aspect of the present invention, there is provided a system for relaying Multicast Broadcast Service (MBS), comprising: a base station; and a plurality of relay stations, wherein the relay stations forms multi-hop relay network, and wherein the base station selects a Modulation and Coding Scheme (MCS) level among a plurality of MCS levels based on channel condition between the base station and the respective relay stations.

Preferably, the base station may receive information on the channel condition to select the MCS level through Channel Quality Information Channel (CQICH) from the relay stations at a predetermined period.

Preferably, the information on the channel condition may comprise throughput values for the relay stations, and the base station may select the MCS level with highest throughput value among the throughput values for the relay stations obtained in response to the base station's transmitting of test data to all the relay stations.

Preferably, the base station may re-select the MCS level with highest throughput value among throughput values for the relay stations updated at a predetermined period.

Preferably, the information on the channel condition may comprise spectrum efficiency values for the relay stations, and the base station may select the MCS level with highest spectrum efficiency value among the spectrum efficiency values for the relay stations.

Preferably, the base station may re-select the MCS level with highest spectrum efficiency value among spectrum efficiency values for the relay stations updated at a predetermined period.

Preferably, the base station may comprise a table capable of being updated, and the table may store at least one of a group consisting of the plurality of MCS levels, throughput values and spectrum efficiency values.

In accordance with another aspect of the present invention, there is provided a method for relaying Multicast Broadcast Service (MBS) in a network, wherein the network comprises: a base station; and a plurality of relay stations forming multi-hop relay network, wherein the method comprises: (a) the base station's receiving information on channel condition between the base station and the relay stations through Channel Quality Information Channel (CQICH) from the relay stations; (b) the base station's selecting a Modulation and Coding Scheme (MCS) level among a plurality of MCS levels based on the information on channel condition; and (c) the base station's transmitting MBS data with the selected MCS level.

Preferably, the method may further comprise: (d) storing the plurality of MCS levels and the information on channel condition in a table of the base station.

Preferably, the base station may receive at least one kind of values of a group consisting of throughput values for the relay stations and spectrum efficiency values for the relay stations as the information on channel condition in the step (a).

Preferably, selecting the MCS level in the step (b) may comprise:
selecting the MCS level with highest spectrum efficiency value among the spectrum efficiency values for the relay stations.

Preferably, selecting the MCS level in the step (b) may comprise: selecting the MCS level with highest throughput value among the throughput values for the relay stations.

Preferably, the method may further comprise: (e) the base station's receiving the information on channel condition through CQICH at a predetermined period and the base station's re-selecting the MCS level among the plurality of MCS levels based on change of the information on channel condition.

Preferably, the step (e) may comprise: determining whether throughput values or spectrum efficiency values for the relay stations are less than a predetermined value; and re-selecting the MCS level if throughput values or spectrum efficiency values for the relay stations are less than a predetermined value.

The system and method for relaying MBS in accordance with the present invention provides an improved data throughput and stable services.

In addition, AMC is adaptively employed based on channel condition between the base station and the respective relay stations.

Moreover, it became possible to properly increase the MCS level of MBS and maintain a predetermined level of BER.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Since many alternatives, modifications and variations can be made from the present invention, preferred embodiments of the present invention will now be described in detail with reference to the accompanying drawings. However, one should understand that it is not intended to be limiting, but embrace all modification, equivalents or substitutions included in the scope and technical field of the present invention. In the following description, well-known functions or constitutions will not be described in detail if they would obscure the invention in unnecessary detail.

Although terms like the first, the second, etc., may be used for explaining diverse elements, the elements are not to be limited by the terms. The terms are used only for distinguishing one element from another.

The terminology used in this application is used simply for explaining particular embodiments, and is not intended to limit the scope of the present invention in any way. As used throughout this disclosure, the singular forms include plural reference unless the context clearly indicates otherwise. Also, it should be understood that the expression of "comprise" or "include" in this disclosure is to designate the existence of features, numbers, steps, operations, elements, parts or combinations thereof that are described in the specification, and does not eliminate beforehand the existence of one or more of other features, numbers, steps, operations, elements, parts, or combinations of thereof or the possibility of addition.

Hereinafter, preferred embodiments of the present invention will now be described with reference to the accompanying drawings. For a more complete understanding of the present invention and the advantages thereof, like reference numerals represent like parts even in different drawings.

Before getting into further details on the drawings, it is necessary to clarify that components described in this specification are divided by primary function each component is responsible for. That is, two or more components to be described below may be incorporated into one component, or one component may be differentiated into more than two by itemized function. In addition, any person skilled in the art may understand that each component may perform, besides its primary function, part or all of functions of another component additionally, and part of the primary function each component is responsible for may be carried out by another component. Therefore, it is important to note whether all components that are explained throughout this specification exist or not should be interpreted in terms of function, and for this reason the configuration of components of MBS relay system in accordance with the present invention may differ from that of FIG. 1 within the scope for achieving the foregoing objectives of the present invention.

Figure 1:
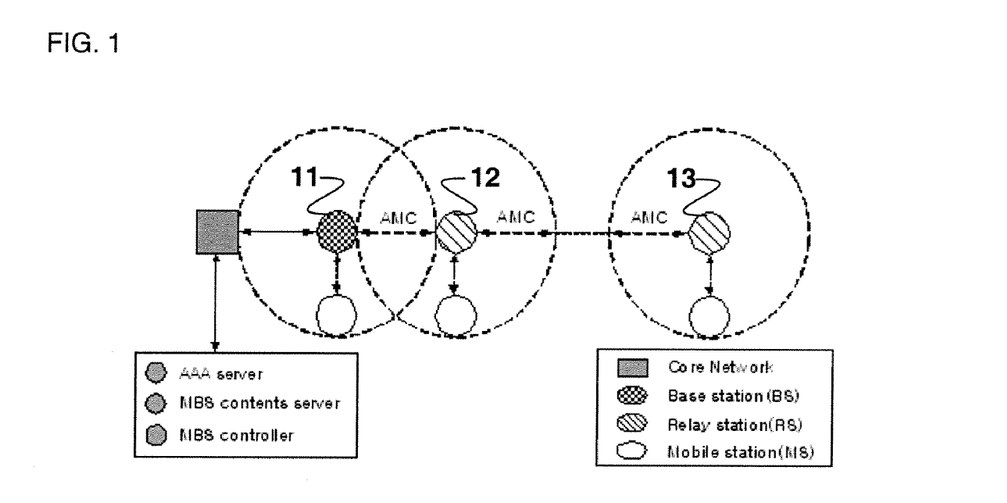
FIG. 1 illustrates the structure of MBS relay system in accordance with one embodiment of the present invention.

FIG. 1 illustrates the structure of MBS relay system in accordance with one embodiment of the present invention.

Referring to FIG. 1, the MBS relay system of the present invention includes a base station 11 and a plurality of relay stations 12 and 13.

Figure 3:
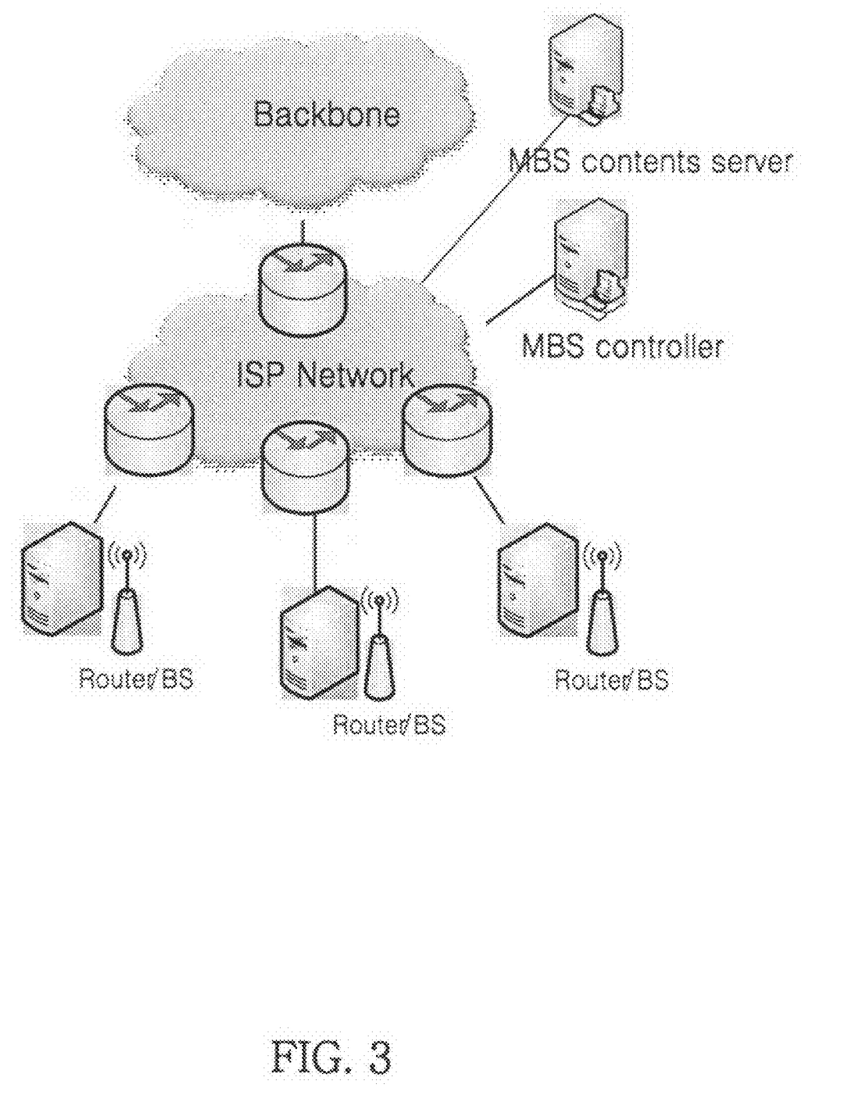
FIG. 3 illustrates single-BS-MBS access mode to which MBS relay system of the present invention is applicable.
Figure 4:
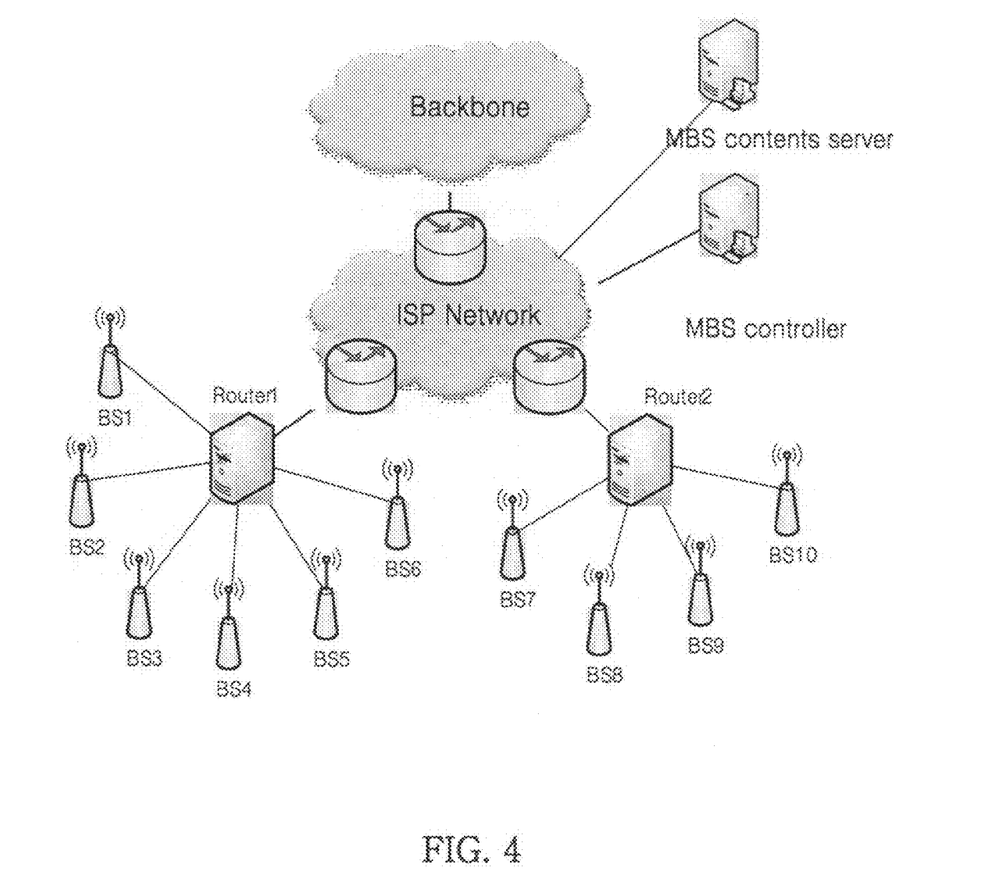
FIG. 4 illustrates multi-BS-MBS access mode to which MBS relay system of the present invention is applicable.

Although not shown in FIG. 1, the MBS relay system may further include a contents server, an MBS controller, etc., as shown in FIG. 3 and FIG. 4, which is obvious to those who are skilled in the art.

Referring to FIG. 1, the relay stations 12 and 13 (hereinafter, collectively referred to as '12') are positioned within a distance capable of receiving MBS data transmission according to MCS levels from the base station.

For more efficient application of AMC, the relay stations 12 in accordance with one embodiment of the present invention forms multi-hop relay network. More details on this will follow.

The base station 11 may employ AMC to maintain appropriate data throughput between the base station 11 and the relay station 12 according to the channel condition. AMC is a method of adaptively changing modulation and coding rate according to the channel condition. Here, information on the channel condition of the relay station 12 is sent from the relay station 12 to the base station 11 through CQICH. However, it is hard to apply AMC to MBS because mobile stations that are accessed to the relay stations 12 are not only mobile, but also are scattered anywhere in the entire cell. That is, because of frequent movement of mobile stations, the relay station 12 where mobile stations get accessed changes at any time. In this regard, the MCS level should be applied adaptively to take the frequent variation in the channel condition of the relay station 12 into account. That is, the base station 11 figures out which relay station has the poorest channel condition or the poorest radio condition to select an appropriate MCS level. Other conventional techniques in the art, however, have used the lowest MCS level to transmit MBS data, because of the above-mentioned problems in the art.

In accordance with one embodiment of the present invention, the relay stations 12 forms multi-hop relay network. The multi-hop relay network allows mobile stations to access the base station 11 with a reduced radio distance through the relay stations 12. Therefore, MBS relay system of the present invention can adaptively apply AMC with higher MCS levels, compared with the MBS relay system in the art. Also, in accordance with the embodiment of the present invention, the base station 11 can provide MBS data to mobile stations at high throughput.

In the existing AMC scheme, the MCS level is modified under the current channel condition, based on Carrier to Interference and noise Ratio (CINR) obtained through feedback transmission.

In this embodiment of the present invention, however, the base station 11 decides an appropriate MCS level of the best throughput among a plurality of designated MCS levels according to channel condition between the base station 11 and the relay station 12 and sends MBS data with the selected MCS level.

Figure 2:
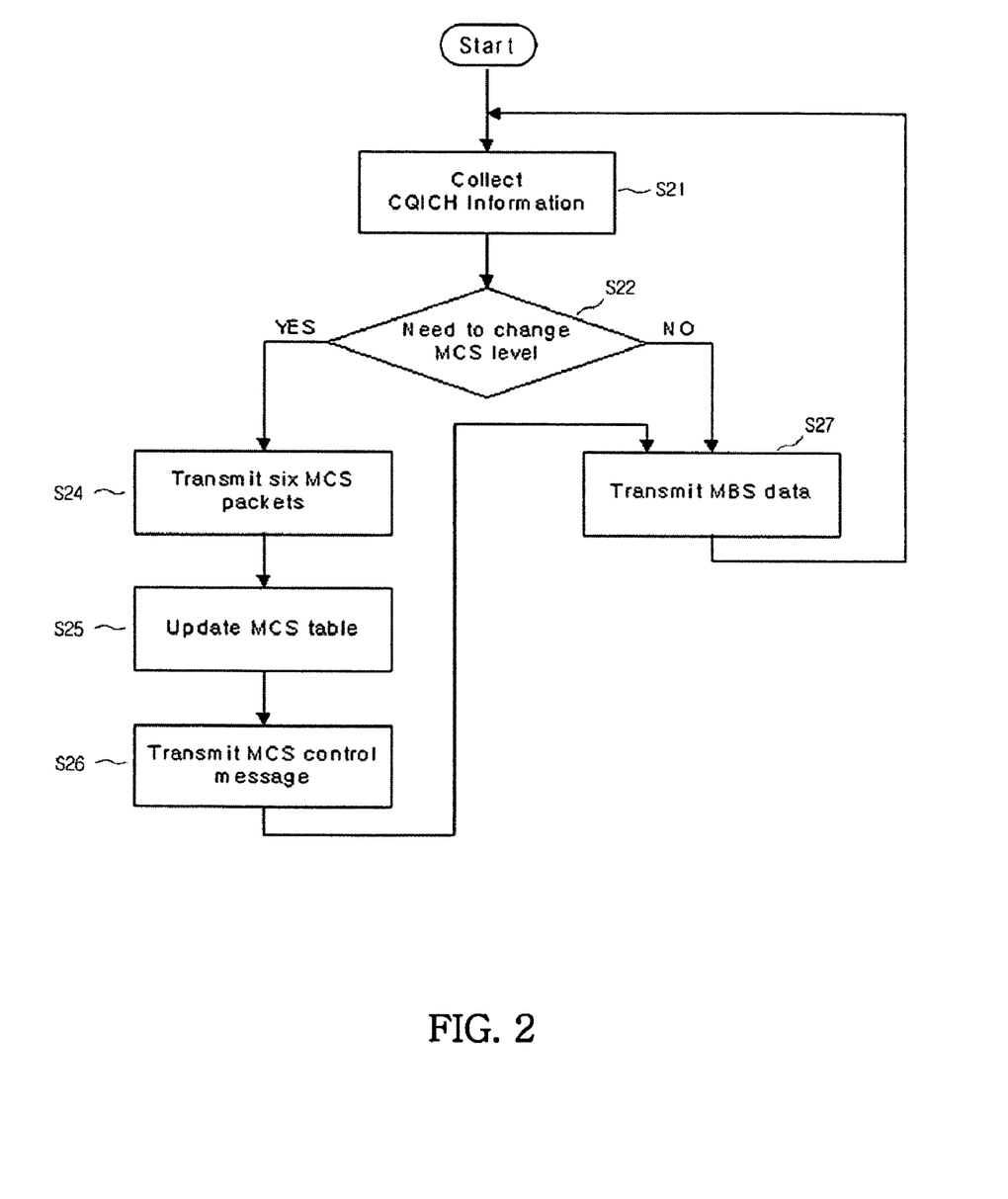
FIG. 2 is a flow chart describing an example of how a base station adaptively determines an appropriate MCS level, in accordance with one embodiment of the present invention.

The following description now explains in detail about FIG. 2.

FIG. 2 is a flow chart for explaining an example of how a base station 11 adaptively determines an appropriate MCS level, in accordance with one embodiment of the present invention.

Referring to FIG. 2, in step S21, the base station 11 receives information on channel condition of the relay stations 12 through CQICH at a predetermined period.

Here, a relay station 12 to which a mobile station get accessed may be placed outside the radio range of the base station 11.

In accordance with this embodiment of the present invention, the relay stations 12 forms multi-hop relay network. Therefore, information on the channel condition of the relay station 12 can be sent to the base station 11 through the information exchange with other relay stations connected through the multi-hop relay network.

Next, in step S22, the base station 11 decides, based on the received information of the channel condition of the relay station 12, whether the current MCS level should be updated.

In detail, the information on the channel condition may include at least one of a group consisting of throughput values between the base station 11 and the relay station 12 that is measured by the relay station 12 and/or spectrum efficiency values on the current channel. As such, the base station 11, based on the throughput values and/or the spectrum efficiency values extracted from the information on the channel condition, may decide to update the MCS level, if the extracted value is below a predetermined value.

For instance, if the extracted throughput value is greater than a predetermined threshold throughput value, the base station 11 regards the channel condition between the base station 11 and the relay station 12 as satisfactory. In this case, the base station 11 does not update the MCS level and uses the existing MCS level for the application of AMC.

Meanwhile, if the extracted throughput value is less than a predetermined threshold throughput value, the base station 11 regards the channel condition between the base station 11 and the relay station 12 unsatisfactory. In this case, the base station 11 decides to update the MCS level for more efficient application of AMC.

If, in step S22, the base station 11 decides not to update the MCS level (NO in S22), in step S27, the base station 11 transmits MBS data with the existing MCS level to the relay station 12.

However, if, in step S22, the base station 11 decides to update the MCS level (YES in S22), the base station 11, in step S24, transmits test MBS data of plural MCS levels to the relay station 12.

For example, the base station 11 can transmit MBS data with six MCS levels to the relay stations 12. Here, six MCS levels comprises: QPSK1/2, QPSK3/4, 16 QAM1/2, 16 QAM3/4, 64 QAM2/3 and 64 QAM3/4.

Before defining the six MCS levels, modulation and coding rate in MCS will be first defined.

In embodiments of the present invention, modulation refers to conversion of digital data into analog signal for wireless data transmission. That is, modulation takes place in amplitude, frequency, and phase for appropriate wireless transmission of digital bit stream. Such digital modulation schemes include:
1. Amplitude Shift Keying (ASK)
2. Frequency Shift Keying (FSK)
3. Phase Shift Keying (PSK)
4. Quadrature Amplitude Modulation (QAM): Combination of the above three.

The MBS relay system in embodiments of the present invention employs Quadrature PSK (QPSK), 16 QAM and 64 QAM.

The following now explains about coding rate.

Coding rate in MCS refers to channel coding. That is, channel coding is a procedure that prevents, to some extent, data loss or change of data that can occur any time and any place in the process of transmission of digital data, and that adds/realigns digital data to restore the original data, if digital data has been lost or changed.

This procedure is very crucial when it comes to digital communications. It is so because if 1 and 0 change to 0 and 1 due to little noise in the digital communications, the original information to be sent can change to totally different information. Thus, channel coding, which is sometimes called error correction coding, is required. When channel coding is performed, the amount of data is increased, compared to that of the original data. For example, when ½ coding is performed, data being transmitted is twice the data that is originally intended to be transmitted. That is, the larger a denominator is, the greater the amount of data is and the smaller the error ratio is.

The six MCS levels in the embodiment of the present invention means six combinations used for an experiment, among all combinations of modulation and coding rate. That is, the six MCS levels are obtained by combining three modulation schemes QPSK, 16 QAM and 64 QAM used for the MBS relay system with the most typically used coding rate out of many coding rates.

For instance, QPSK1/2 and QPSK3/4 are phase shift keying schemes combined with ½ and ¾ coding rates, respectively.

Further, 16 QAM1/2, 16 QAM3/4, 64 QAM2/3 and 64 QAM3/4 are quadrature amplitude modulation and coding schemes, the first two being 16 quadrature amplitude modulation schemes for encoding 16 symbols with 4 bits combined with ½ and ¾ coding rates, respectively, the latter two being 64 quadrature amplitude modulation schemes for encoding 64 symbols with 6 bits combined with ⅔ and ¾ coding rates, respectively.

The six MCS levels are used for illustrative purposes only, so any number of MCS levels can also be employed, as is obvious to those who are skilled in the art to which the present invention pertains.

Next, in step S25, the base station 11 receives, from the relay stations, feedback information in response to plural test MBS data and updates MCS table based on the received feedback information. Specifically, the feedback information that the base station 11 receives may include throughput values and spectrum efficiency values between the base station 11 and the relay stations 12. Moreover, the base station 11 updates, based on the throughput values and spectrum efficiency values, MCS table that contains MCS levels, throughput values and spectrum efficiency values corresponding to MCS level.

Updating MCS table by the base station 11 is just an example, and it is obvious to any one skilled in the art that the information can be stored in any other way, besides the table.

In step S25, the base station 11 also used the updated MCS table to decide an update MCS level, which is the optimum MCS level among the plural MCS levels.

For instance, the base station 11 re-selects an MCS level with the highest spectrum efficiency value among the six MCS levels as the optimum MCS level.

Next, in step S26, the base station 11 transmits an MCS control message including information on the updated MCS level to the relay station 12. Here, having received the MCS control message, the relay station 12 continuously receives AMC-applied MBS data with the updated MCS level, until it receives a new MCS control message.

In step S27, the base station 11 transmits MBS data with the updated MCS level to the relay station 12.

So far, it has been explained how the base station 11 adaptively updates the MCS level, in accordance with one embodiment of the present invention.

Hereinafter, spectrum efficiency and MBS data throughput in the relay station 12 in accordance with one embodiment of the present invention will be explained.

As discussed earlier, the relay stations 12 in accordance with one embodiment of the present invention forms multi-hop relay network. In order to model the multi-hop relay network that improves throughput values of MBS data, it is necessary to take the characteristics of multicasting and broadcasting into account. The relay station 12 is capable of relaying traffic and supporting user access/control and transmission and reception of management messages.

Referring to the proposed network architecture shown in FIG. 1, the overall bandwidth (OB) can be expressed as Equation 1, where n denotes the number of relay stations, RBi denotes the bandwidth between the (i−1)th relay station and the (i)th relay station, and RB0 denotes the bandwidth between the base station 11 and the first relay station. Although MB denotes the bandwidth between mobile stations, MBS, where one spectrum bandwidth is shared, uses a fixed bandwidth regardless of the number of mobile stations. Hence, the OB for MBS can be written as:

$$OB = \sum_{i=o}^{n-1} RB_i + MB \quad (1)$$

Every mobile station can receive the same content service of the MBS from the base station 11 through the relay station 12 by using the same shared spectrum bandwidth. However, since the base station 11 transmits MBS data employing AMC, system resources are not shared, and the bandwidth has to be allocated individually.

The spectrum efficiency refers to a maximum amount of data that can be transmitted over a given bandwidth in the wireless network, and it is measured in bit/s/Hz. The current spectrum efficiency is calculated by transmitted data from the base station 11 to the relay stations 12 for the measurement of current channel condition. REi denotes current spectrum efficiency of the (i)th relay station, and ME denotes current spectrum efficiency of the mobile station. The bandwidth for a relay station RBi in MEBS can then be written as:

$$RB_i = \frac{OB}{\frac{1}{ME} + \sum_{i=0}^{n-1} \frac{1}{RE_i}} \times \frac{1}{RE_i} \quad (2)$$

Using Equation (1) and Equation (2), the relation between the overall bandwidth and the spectrum efficiency can be written as:

$$OB = MBS_{thr} \times \left( \frac{1}{ME} + \sum_{i=0}^{n-1} \frac{1}{RE_i} \right) \quad (3)$$

where MBSthr is the throughput value of MBS.

Again, as mentioned before, the relay stations 12 can form multi-hop relay network. In this case, for an n-hop network, the proportional relation between spectrum efficiency and MBS data throughput can be written as:

$$MBS_{thr} \propto \left( ME + \sum_{i=0}^{n-1} RE_i \right) \quad (4)$$

where REi denotes the current spectrum efficiency that is measured by the relay station 12 and reported to the base station 11. The base station 11 uses REi to select an appropriate MCS level for MBS data transmission.

Although MCS level for mobile stations and the overall bandwidth are fixed in the MBS relay system in accordance with the embodiment of the present invention, the MCS level for the relayed station can be used as a control factor of the MBS throughput.

In general, high spectrum efficiency achieved by high order MCS level allows high throughput. However, higher order MCS level does not always guarantee higher throughput. This is because the MCS level supporting high spectrum efficiency is more easily affected by channel condition. To select the MCS level for high MBS throughput, therefore, high spectrum efficiency for the relay stations is needed in the current channel condition.

The MBS relay system in accordance with the embodiment of the present invention is advantageous not only for the improvement of data throughput, but it also easily expands the service coverage because data services are provided over the multi-hop network. Therefore, high quality broadcast services are provided to broader areas with a very fast and stable data throughput.

So far, the spectrum efficiency and MBS data throughput in the relay stations 12 have been explained with the equations above.

FIG. 3 illustrates single-BS-MBS access mode to which MBS relay system of the present invention is applicable, and FIG. 4 illustrates multi-BS-MBS access mode to which MBS relay system of the present invention is applicable.

It is obvious to people skilled in the art that relay stations can be connected to base stations through multi-hop relay network as shown in FIG. 3 and FIG. 4, and the techniques that have been explained with reference to FIG. 1 and FIG. 2 can also be applied here.

Figure 5:
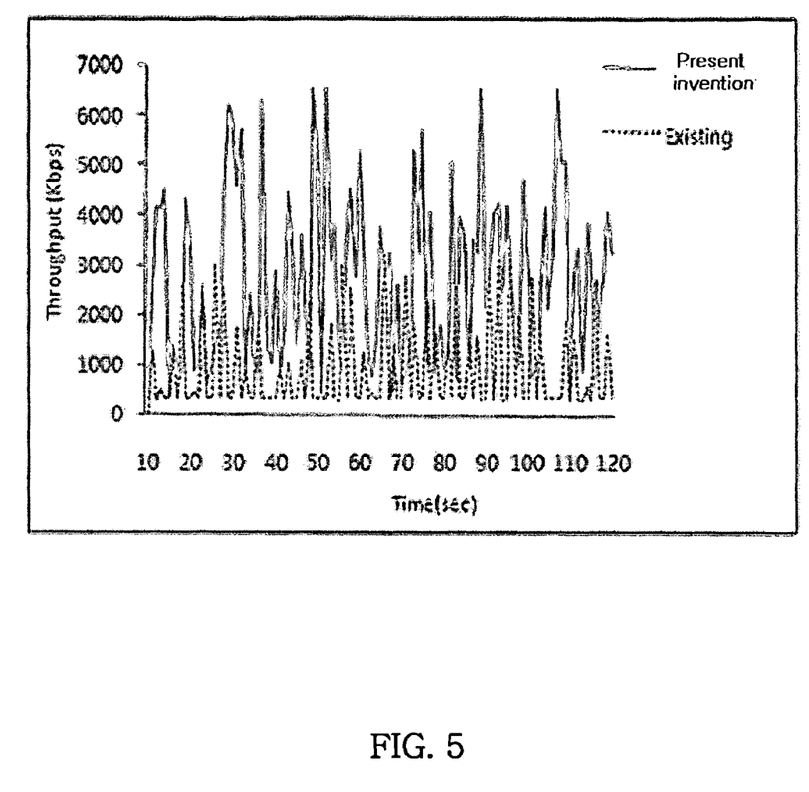
FIG. 5 through FIG. 7 respectively explain effects of one embodiment of the present invention.
Figure 6:
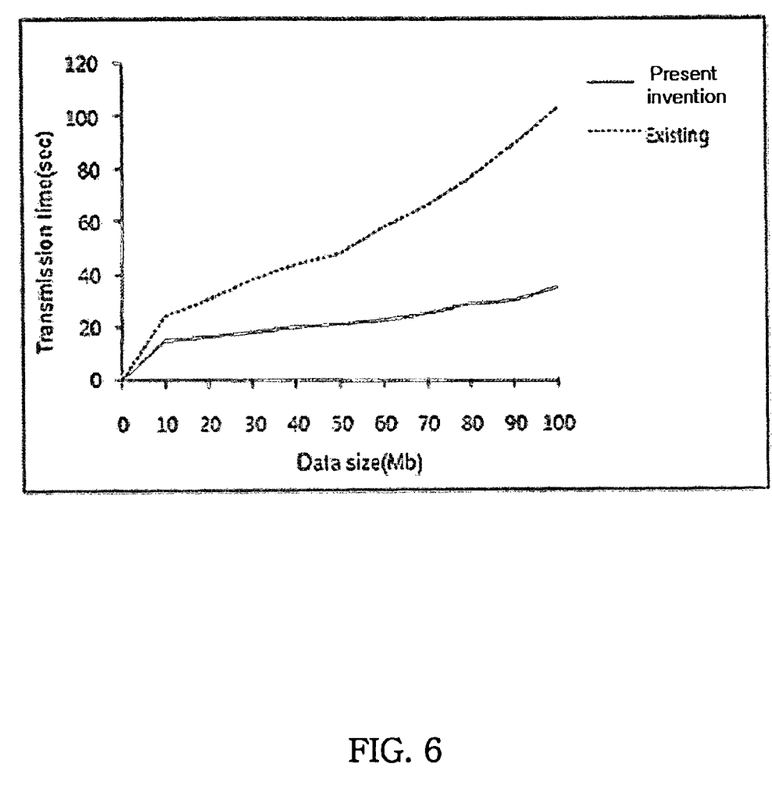
Figure 7:
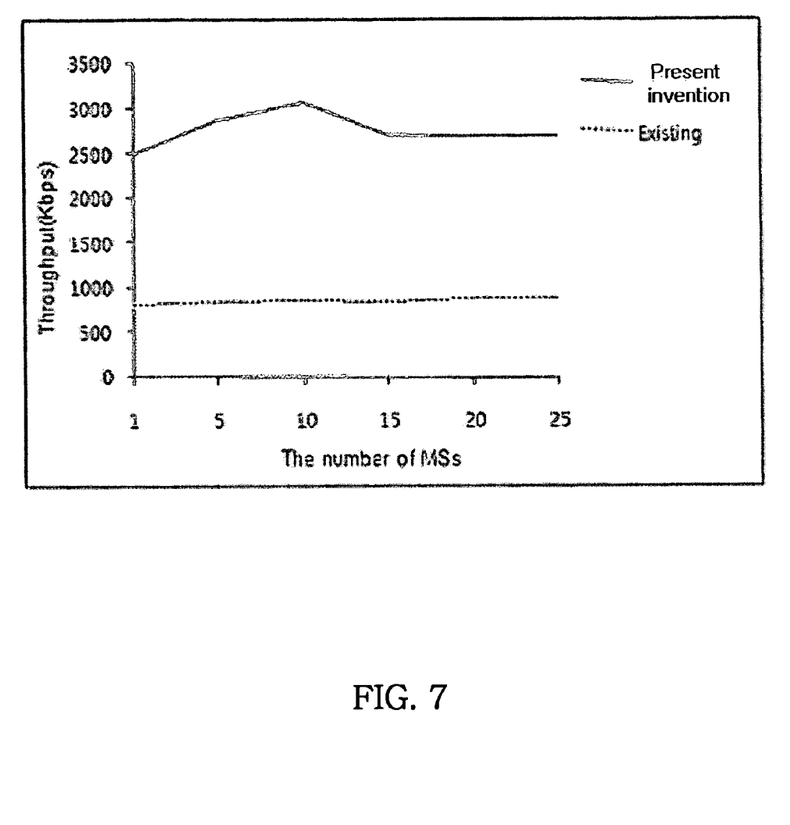

FIG. 5 through FIG. 7 respectively explain effects of the embodiment of the present invention.

In FIG. 5, X-axis denotes time and Y-axis denotes throughput values. As can be seen from FIG. 5, MBS relay system according to the present invention is consistently better in throughput values against time than the AMC in the art. Specifically, higher throughput is obtained by adaptively updating the MCS level depending on channel condition between the base station 11 and the relay station 12.

In FIG. 6, X-axis denotes MBS data size, and Y-axis denotes transmission time of data of each side. As can be seen from FIG. 6, in case of the AMC in the art, transmission time increases proportionally to MBS data size. However, in case of the MBS relay system in accordance with the embodiment of the present invention, transmission time does not increase substantially although MBS data size increases.

In FIG. 7, X-axis denotes the number of mobile stations, and Y-axis denotes throughput values. As can be seen from FIG. 7, the MBS relay system in accordance with the embodiment of the present invention maintains consistently higher throughput values regardless of the number of mobile stations, and the throughput offered by the present invention system is about three times higher than that of the AMC in the art.

An MBS relay method in accordance with the embodiment of the present invention may be implemented in the form of program command to be executed through diverse computer means and recorded in computer readable recording media. Computer readable recording media include, but are not limited to, program commands, data files, data architectures, etc., which are used singly or in combination.

Program commands to be recorded on a computer readable recording medium may be either designed and configured particularly for the present invention, or well known to any one skilled in the computer software field. Examples of the computer readable recording media include, but are not limited to, magnetic media such as hard disks, floppy disks and magnetic tapes, optical media such as CD-ROMs and DVDs, magneto-optical media such as floptical disks, and hardware devices such as ROMs, RAMs and flash memories that store program commands and execute them. In addition, the media may be transmission media such as optical fiber, metal wires and waveguides transmitting carrier waves carrying signals for designating program commands, data architecture, etc. Examples of the program commands include, but are not limited to, machine codes made by compiler or high level language codes that can be executed by a computer using an interpreter.

The hardware devices described above can be configured as one or more software module to execute the operation of the present invention, and vice versa.

While the invention has been shown and described with respect to the preferred embodiments, it will be understood by those skilled in the art that various changes and modification may be made without departing from the spirit and scope of the invention as defined in the following claims.

What is claimed is:

1. A system for relaying Multicast Broadcast Service (MBS), comprising:
    a base station; and
    a plurality of relay stations,
    wherein the relay stations forms multi-hop relay network,
        wherein the base station selects a Modulation and Coding Scheme (MCS) level among a plurality of MCS levels based on channel condition between the base station and the respective relay stations,
    wherein the base station receives information on the channel condition to select the MCS level through Channel Quality Information Channel (CQICH) from the relay stations at a predetermined period,
    wherein the base station decides, based on the information on the channel condition, whether the MCS level is updated, and
    wherein, if the base station decides to update the MCS level, the base station transmits test MBS data of plural MCS levels to the relay stations, receives, from the relay stations, feedback information in response to the test MBS data, decides an updated MCS level based on the feedback information, and transmits MBS data with the updated MCS level to the relay stations.

2. The system of claim 1, wherein the information on the channel condition comprises throughput values for the relay stations, and wherein the base station selects the MCS level with highest throughput value among the throughput values for the relay stations obtained in response to the base station's transmitting of test data to all the relay stations.

3. The system of claim 1, wherein the information on the channel condition comprises spectrum efficiency values for the relay stations, and wherein the base station selects the MCS level with highest spectrum efficiency value among the spectrum efficiency values for the relay stations.

4. The system of claim 1, wherein the base station comprises a table capable of being updated, and wherein the table stores at least one of a group consisting of the plurality of MCS levels, throughput values and spectrum efficiency values.

5. A method for relaying Multicast Broadcast Service (MBS) in a network,
    wherein the network comprises: a base station; and a plurality of relay stations forming multi-hop relay network,
    wherein the method comprises,
    (a) receiving, by the base station, information on channel condition between the base station and the relay stations through Channel Quality Information Channel (CQICH) from the relay stations at a predetermined period;
    (b) selecting, by the base station, a Modulation and Coding Scheme (MCS) level among a plurality of MCS levels based on the information on channel condition; and
    (c) transmitting, by the base station, MBS data with the selected MCS level,
    wherein selecting the MCS level in the step (b) comprises,
    deciding, by the base station, based on the information on the channel condition, whether the MCS level is updated, and
    if the base station decides to update the MCS level, transmitting, by the base station, test MBS data of plural MCS levels to the relay stations, receiving, by the base station, from the relay stations, feedback information in response to the test MBS data, and selecting, by the base station, the MCS level based on the feedback information.

6. The method of claim 5, further comprising:
    (d) storing the plurality of MCS levels and the information on channel condition in a table of the base station.

7. The method of claim 6, wherein the base station receives at least one kind of values of a group consisting of throughput values for the relay stations and spectrum efficiency values for the relay stations as the information on channel condition in the step (a).

8. The method of claim 7, wherein selecting the MCS level in the step (b) comprises:
    selecting the MCS level with highest spectrum efficiency value among the spectrum efficiency values for the relay stations.

9. The method of claim 7, wherein selecting the MCS level in the step (b) comprises:
    selecting the MCS level with highest throughput value among the throughput values for the relay stations.

* * * * *